United States Patent [19]

Malatesta et al.

[11] 3,867,270

[45] Feb. 18, 1975

[54] UV CURING OF CONJUGATED DIENE-CONTAINING BUTYL RUBBER

[75] Inventors: Alberto Malatesta, Brussels, Belgium; Francis P. Baldwin, Summit, N.J.

[73] Assignee: Esso Research and Engineering Company

[22] Filed: Sept. 13, 1973

[21] Appl. No.: 397,084

[52] U.S. Cl....... 204/159.18, 117/93.31, 204/159.2, 260/42.35, 260/42.36, 260/85.3 R, 260/85.3 C, 260/85.34, 260/879
[51] Int. Cl............................. B01j 1/10, B01j 1/12
[58] Field of Search................... 204/159.18, 159.2; 260/85.3 R, 85.3 C, 85.3 H

[56] References Cited

UNITED STATES PATENTS

| | | | |
|---|---|---|---|
| 3,338,810 | 8/1967 | Warner | 204/159.18 |
| 3,775,387 | 11/1973 | Baldwin | 260/85.3 H |
| 3,816,371 | 6/1974 | Baldwin et al. | 260/85.3 H |

*Primary Examiner*—John C. Bleutge
*Assistant Examiner*—Richard B. Turer

[57] ABSTRACT

Conjugated diene-containing butyl rubber is cured with ultra violet radiation, with the aid of certain photosensitizers. Provides for new class of sealants and mastic compounds based on butyl rubber.

10 Claims, No Drawings

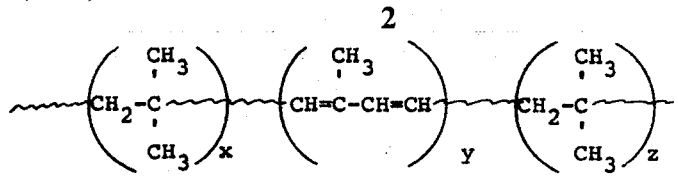

UV CURING OF CONJUGATED DIENE-CONTAINING BUTYL RUBBER

BACKGROUND OF THE INVENTION where $x$, $y$ and $z$ have the values previously described, though at least one double bond may lay outside the linear backbone. This variation may be represented by the formula:

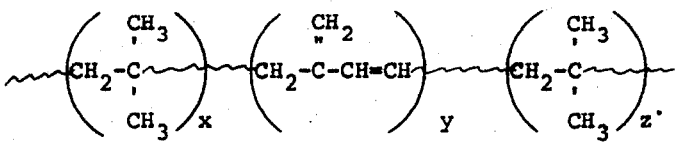

1. Field of the Invention

The present invention relates to conjugated diene containing butyl rubber and a method of curing same.

2. Description of the Prior Art

The expression "butyl rubber" is used in the rubber industry to describe copolymers made from a polymerization reaction mixture having therein from 70 to 99.5% by wt. of an isoolefin which has about 4 to 7 carbon atoms, e.g., isobutylene, and about 30 to 0.5% by wt. of a conjugated multiolefin having from about 4 to 14 carbon atoms, e.g., isoprene. The resulting copolymers contain 85 to 99.5% by wt. of combined isoolefin and about 0.5 to 15% of combined multiolefin. The preparation of butyl rubber is described in U.S. Patent 2,356,128, which is incorporated herein by reference.

The polymer backbone of commercial butyl rubber is made up primarily of isobutylene units, with just a few percent of isoprene units. The isoprene units contribute the small amount of unsaturation present in butyl rubber. The basic equation is represented by:

$$\underset{\text{isobutylene}}{\underset{|}{\overset{CH_3}{\underset{|}{CH_2=C}}}\atop{CH_3}} + \underset{\text{isoprene}}{\overset{CH_3}{\underset{|}{CH_2=C-CH=CH_2}}}$$

which combine in the presence of Friedel-Crafts catalysts to form:

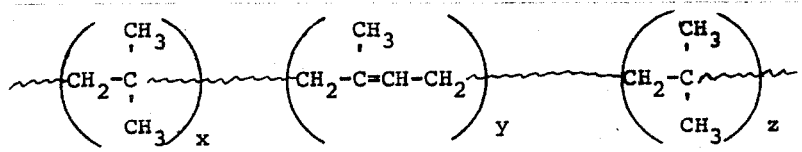

where $x+z$ represent the number of isoolefin units incorporated in the butyl rubber, while $y$ represents the number of initial diolefin units present, substantially as randomly distributed units. The conjugated diolefin, isoprene, loses one olefinic linkage upon its essentially random incorporation into the polymer backbone.

Thus, butyl rubber, as presently produced, contains only a small percentage of unsaturation, in the form of the single double bond associated with the isoprene residue which is incorporated more or less randomly throughout the polymer chain.

The present inventors discovered that butyl rubber could be produced containing conjugated unsaturation, most of which is in the linear polymer backbone. The general formula may be represented by:

This new butyl rubber has been termed "high reactivity butyl" (HRB) and encompasses the conjugated diene butyl rubber, regardless of where the unsaturation resides in the chain.

The HRB is more completely described in a copending U.S. application Ser. No. 228,727, now U.S. Pat. No. 3,816,371 filed Feb. 23, 1972. One of the preferred methods of preparing this butyl rubber is described in copending U.S. application Ser. No. 228,728, filed by Francis P. Baldwin on Feb. 23, 1972 now U.S. Pat. No. 3,775,387. Both applications are incorporated herein by reference.

The present invention is directed to a unique method of curing the high reactivity butyl rubber, which method is more particularly described hereinbelow.

SUMMARY OF THE INVENTION

There has now been discovered a method of vulcanizing conjugated diene-containing butyl rubber which comprises blending with said rubber from 0.01 to 5.0 parts of an ultraviolet light-responsive photosensitizer per 100 parts of said rubber and subsequently exposing said blend to ultraviolet radiation for a time sufficient to crooslink at least 70 percent of said rubber.

The use of a photosensitizer leads to crosslinking and attendant insolubilization of from 70 to 95% of the conjugated diene-containing butyl rubber. Use of from 0.01 to 5 phr, preferably from 0.1 to 3.0 phr, of sensitizer causes substantial crosslinking of the rubber in a commercially acceptable length of time. Typical of the sensitizers is benzophenone. Either natural light or artificial light is suitable to produce the required level of ultraviolet light for crosslinking.

DESCRIPTION OF THE PREFERRED EMBODIMENT

The high reactivity butyl rubber, containing the conjugated-diene unsaturation, is prepared by dehydrohalogenation of halogenated butyl rubber.

Halogenated butyl rubber has been developed in recent years and has contributed significantly to the elastomer business. A method of preparing halogenated butyl rubber is described in U.S. Pat. No. 3,099,644, which is incorporated herein by reference. Both chlorinated and brominated butyl rubber are well known in the art. The formula for halogenated butyl rubber is typified by:

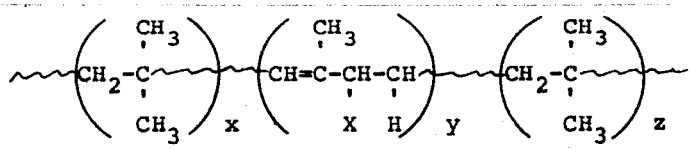

where $x$, $y$ and $z$ have the same values as for butyl rubber, described above, though this structure is but one of several which can be formed, depending on the conditions of halogenation, the halogenating agent used, etc.

Halogenated butyl rubber is commerically available and may be prepared by halogenating butyl rubber in a solution containing 1 to 60% by weight butyl rubber in a substantially inert $C_5$-$C_8$ hydrocarbon solvent such as pentane, hexane, heptane, etc., and contacting this butyl rubber cement with a halogen gas for a period of about 2–25 minutes. There is then formed the halogenated butyl rubber and a hydrogen halide, the copolymer containing up to one or somewhat more, especially in the case of bromine, halogen atom per double bond initially present in the copolymer. This invention is not intended to be limited in any way by the manner in which butyl rubber is halogenated or dehydrohalogenated and both chlorinated and brominated butyl rubber are suitable for use in preparing the elastomer for use in this invention.

Illustrative of halogenated butyl rubber is Exxon Butyl HT 10–68 (a chlorinated butyl rubber which before halogenation analyzes ~1.8 mole % unsaturation and a viscosity average molecular weight of about 450,000). However, for the purposes of this invention, it is preferred that the butyl rubber starting material have incorporated therein from about 0.5 to 6 mole % of combined diolefin, more preferably 0.5 to 3 mole %, e.g., about 2 mole %.

Conventional high molecular weight butyl rubber generally has a number average molecular weight of about 25,000 to about 500,000, preferably about 80,000 to about 300,000, especially about 100,000 to about 250,000, and a Wijs Iodine No. of about 0.5 to 50, preferably 1 to 15. More recent low molecular weight polymers are prepared to have number average molecular weights of from 5,000 to 25,000 and unsaturation expressed as mole %, of 2–10.

A particularly advantageous method of preparing conjugated diene-containing butyl polymers comprises heating a solution of halogenated butyl rubber in the presence of a soluble metal carboxylate. Suitable metals are the polyvalent metals of Groups Ib, IIb, IVa and VIII, of the Periodic Table, having a relatively high first ionization potential and whose halides are to some extent soluble in the hydrocarbon reaction medium at the reaction temperature. Typical of these are zinc, iron, mercury, nickel, copper, tin and cadmium carboxylates.

Especially useful are the soluble carboxylic acid salts of zinc (e.g., zinc salts of naphthenic acids). While useful in preparing the compositions of the present invention, potential toxicity problems which could be encountered in practicing the present invention might limit the use of certain metals, such as cadmium and mercury salts, for example.

Zinc carboxylate is the most preferred catalyst is the present invention. However, in dehydrohalogenating the halogenated butyl rubber, according to the present invention, zinc chloride is thought to be a by-product in the reaction. Zinc chloride, being an effective Friedel-Crafts type catalyst, may lead to molecular weight degradation or crosslinking of the halogenated polymers, depending on the structure of the polymer, the solvent being employed, the reaction temperature, etc.

This difficulty is overcome, in the present invention, by having present in the reaction zone a metal oxide, hydroxide or carboxylate whose halogen salt is insoluble in the reaction medium.

It has been found that the mole percent of conjugated diene unsaturation in a typical dehydrohalogenated butyl prepared from chlorinated or brominated commercial butyl rubber, ranges from about 0.5 to about 3.0 mole %.

While the conjugated diene-containing rubber may be crosslinked by a variety of reagents such as sulfur, sulfur-containing curing agents, polyfunctional dienophiles, and the like, there are several applications for the high reactivity rubber in which such cures are not suitable. Generally, such cures require excessive heat to be applied or very long times to effect crosslinking.

Thus, if the high reactivity rubber is used in preparing sealants, caulks, sheeting, tubes and the like, conventional curing techniques are not suitable.

The use of hard radiation, such as gamma radiation, effectively crosslinks the conjugated diene high reactivity rubber, but may be objectionable for many reasons, such as cost, health hazards and difficulty of application for certain end uses of the rubber. On the other hand, the use of softer radiations cannot be similarly employed because of the relative inertness of the conjugated double bond system.

However, the use of ultraviolet (UV) radiation for vulcanization of the high reactivity rubber is possible in a short period of time, if certain UV photosensitizers are employed. It has been found that a relative minor amount of a UV photosensitizer, e.g., 0.01 to 5.0 phr, preferably from 0.05 to 3.0 phr, blended into the rubber, results in vulcanization of the rubber via crosslinking reactions involving the conjugated double bonds present in different macromolecules leading to interchain carbon carbon links.

While not wishing to be bound thereby, it is postulated that such crosslinks occur as illustrated below:

In practice, the high reactivity butyl can be compounded with the photosensitizer, filler, oil and other compounding ingredients, and subsequently extruded into shaped articles, cast as a film or extruded as a sealant or caulking compound. The compounded rubber is then exposed to the UV radiation which causes the rubber to crosslink.

Alternatively, the rubber may be compounded, with the sensitizer, and packaged for later use, such as a

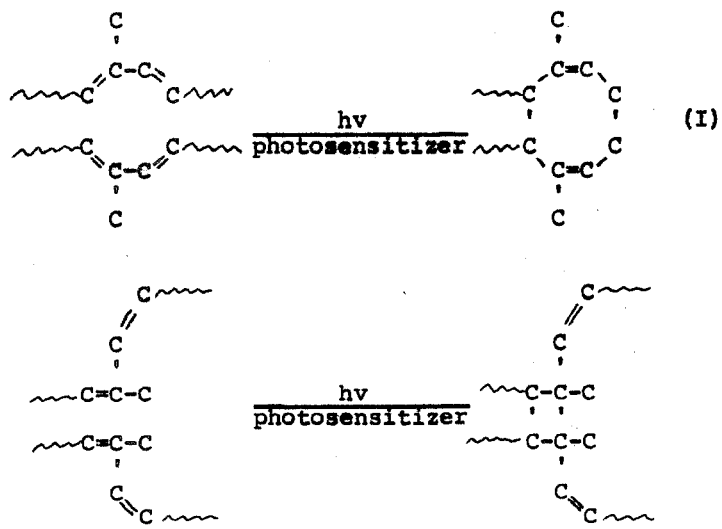

caulk or sealant. The end user then just extrudes the rubber into the use site, with natural light furnishing the necessary UV radiation for curing.

Adhesive tapes may be prepared by depositing the compounded rubber on a suitable substrate and partially UV curing the rubber. The UV exposure of the compounded rubber enhances the rheological characteristics of the rubber-adhesive layer. Tubeless tire innerliners may be prepared in essentially the same manner as the adhesive tape. The compounded rubber is calendered or otherwise formed into a sheet and subsequently either one or both sides are exposed to UV radiation.

The advantages of the present invention will be more completely understood by reference to the following examples.

EXAMPLE 1

In order to demonstrate the preparation of the high reactivity, conjugated diene-containing butyl rubber, the following experiment was conducted.

A one liter glass, vapor jacketed reactor, fitted with stirrer and reflux condenser on reactor and jacket, was charged with 50 grams of a chlorinated butyl rubber (Chlorobutyl HT-10-68, manufactured by Exxon Chemical Company, U.S.A.), in about 500 cc of xylene, 4 g. zinc naphthenate, 0.5 g. naphthenic acid, and 3 g. powdered lime (CaO). The zinc naphthenate, naphthenic acid and CaO were added after the rubber was dissolved. The reactor was then blanketed with nitrogen.

The vapor jacket, also charged with xylene, was then brought to reflux leading to a reactor temperature of about 138°C. After 0.5, 1, 2 and 4 hours of heating, 75 ml. samples were withdrawn from the reactor, placed in centrifuge tubes, diluted with approximately 30 ml. of hexane and centrifuged.

The clear fluid in the tubes was then slowly poured into rapidly agitated acetone to precipitate the polymer. The precipitate was then stored for 12 hours under 200 ml. fresh acetone containing 0.2 g. of an antioxidant. The polymer was dried in a vacuum oven at about 50°C. for 16 hours.

Samples were submitted for chlorine analysis, the results of which are in Table I.

TABLE I

| Sample | CHLORINE ANALYSIS Reaction Time, Hrs. | % Cl | % Cl Removed |
|---|---|---|---|
| A | 0 | 1.14 | 0 |
| B | 0.5 | 0.24 | 78.8 |
| C | 1.0 | 0.21 | 81.5 |
| D | 2.0 | 0.14 | 87.6 |
| E | 4.0 | <0.06 | >97 |

The material remaining in the reactor, which was allowed to cool to ambient temperature after 4 hours of heating at 138°C., was removed from the reactor and diluted with about 600 ml. hexane, the solids settled by gravity and the polymer contained in the clear supernatant fluid precipitated in acetone. The precipitate (designated Sample F) was treated in the same manner as the withdrawn samples in Table I.

After drying, the Sample F was compounded as follows:

| Polymer Sample F | 100 parts |
|---|---|
| m-phenylene — bis-maleimide | 4.5 |

A sample of this material was placed in a mold in a curing press for 60 minutes at 100°C. On removal of the crosslinked vulcanizate, a sample was immersed in cyclohexane. At equilibrium, the sample exhibited a swelling ratio (wt. of sample + wt. of solvent/wt. of sample) of 3.62, indicating a highly crosslinked network.

Drying and reweighing of the swollen sample indicated insolubilization (rubber recovered) of greater than 96% of the polymer.

EXAMPLES 2-5

Using a sample of conjugated diene-containing butyl rubber, prepared in the manner illustrated in Example 1, a series of samples were prepared for exposure to artificial UV. The UV source was a Philips MLU 300W Sunlamp which was placed 50 cm from the surface of film cast from the samples. The distance was measured from the lamp's glass surface.

The samples were prepared by dissolving the diene butyl rubber in benzene, adding thereto the sensitizer, which in this case was benzophenone. The film consisted of 100 parts diene butyl and 0.2 parts benzophenone (except for No. 5, which was the "blank" and contained no photosensitizer). The UV exposure was calculated to be 2.58 mwatts/cm$^2$. The film was exposed for several periods of time, as shown in Table II, and at several temperatures.

Swell ratio and percent rubber recovered data, after exposure, indicate degree of crosslinking activity. If no crosslinking occurs, the exposed rubber would be completely soluble in cyclohexane, i.e., recovered rubber would be zero. The swelling capacity of the gel (crosslinked) rubber indicates the density of crosslinking (the lower the swell ratio, the higher the crosslink density).

TABLE II

UV Exposed[a] Conjugated Diene-Containing Butyl Film

| Hrs. of Irradiation | 1 | 2 | 4 | 8 | T°C. of Irradiation |
|---|---|---|---|---|---|
| Examples | | | | | |
| 2. Swell ratio | 17.2 | 10.3 | 8.4 | 7.1 | 12 |
| Rubber recovered, % | 85.1 | 90.8 | 89.5 | 89.2 | |
| 3. Swell ratio | 14.8 | 9.3 | 7.4 | 6.6 | 27 |
| Rubber recovered, % | 86.9 | 91.0 | 92.4 | 89.2 | |
| 4. Swell ratio | 14.2 | 9.3 | 6.0 | 4.0 | 49 |
| Rubber recovered, % | 82.0 | 77.4 | 76.7 | 73.9 | |
| 5. Swell ratio[b] | — | — | 57.2 | 34.3 | 28 |
| Rubber recovered, % | — | — | 69.7 | 72.9 | |

[a]The UV lamp emitted 280–404nm, resulting in a radiation dose of 2.58 mwatts per square centimeter (cm$^2$).
[b]This was the "blank", no benzophenone being present.

EXAMPLE 6

In order to demonstrate the utility of the present invention, when exposed to very low level UV radiation, a cast film was prepared containing 100 parts of diene rubber and 1.8 parts of benzophenone. The film was cast from a benzene solution.

The film was then exposed to UV emitted from a standard Fade-O-Meter for three (3) hours.

The exposed film was then placed in cyclohexane. The swell ratio was 16.7, and 73.7% of the rubber was recovered.

EXAMPLE 7

Example No. 6 was repeated using 0.18 phr benzophenone. Again the exposed film was placed in cyclohexane. The swell ratio was 22.8 and 69.8% of the rubber was recovered.

EXAMPLE 8

Following the procedure of Example 6, a compounded conjugated diene-containing butyl rubber was prepared and cast as a film, followed by UV exposure on the Fade-O-Meter. The compound contained:

| 100 parts | rubber |
| 50 parts | HAF black |
| 0.2 parts | benzophenone |

A cure was obtained that was essentially equivalent to that in Example 6.

EXAMPLE 9

Following the procedure of Example 6, again, a sample of conjugated diene-containing butyl rubber was prepared utilizing a "free-radical coagent" as an accelerator in vulcanizing the UV exposed rubber. The coagent was ethylene dimethacrylate (EDMA). The compound was:

| 100 parts | rubber |
| 0.2 parts | benzophenone |
| 8.2 parts | EDMA |

The swell ratio, in cyclohexane was 23.5.

In the above examples it is seen that degree of vulcanization can be varied by amount of sensitizer, length of time the rubber is exposed to the UV radiation, temperature and the like.

Temperature seems to have little effect on cure time between 12° and 49°C. as expected. Further, it has been found that curing may take place at temperatures ranging from −60° to 200°C. However, preferred temperature of vulcanization is in the range of from −10° to 60°C. for outdoor applications and from 20° up to 100°C. for industrial, indoor-type applications.

Useful photosensitizers are benzophenone, propiophenone, cyclopropyl phenyl ketone, acetophenone, 1.3.5-triacetyl benzene, benzaldehyde, thioxanthane, authraquinone, β-naphthyl phenyl ketone, β-naphthaldehyde, β-acetonaphthone, 2.3-pentanedione, benzil, fluorenone, pyrene, benzanthrone, and anthracene. While most of these are well-known photosensitizers, which have been tested, other photosensitizers, responsive to UV radiation, would work equally well in the present invention.

The present invention is not to be limited to specific photosensitizers, since the many known photosensitizers tested have all tended to work essentially equally well. However, the specific cross-bonding for the different sensitizers may vary, according to the dimerization species formed by the isoprene moieties present in the conjugated diene-containing butyl rubber.

What is claimed is:

1. A method of vulcanizing a copolymer consisting of 85 to 99.5% by weight of an isoolefin having about 4 to about 7 carbon atoms combined with 15 to about 0.5% by weight of a conjugated diolefin having about 4 to about 14 carbon atoms containing in the linear backbone conjugated diene unsaturation which comprises blending with said rubber from 0.01 to 5.0 parts of an ultraviolet light-responsive photosensitizer per 100 parts of said rubber (phr) wherein said photosensitizer is selected from the group consisting of benzophenone, propiophenone, cyclopropyl phenyl ketone, acetophenone, 1,3,5-triacetyl benzene, benzaldehyde, thioxanthane, authraquinone, β-naphthyl phenyl ketone, β-naphthaldehyde, β-acetonaphthone, 2,3-pentanedione, benzil, fluorenone, pyrene, benzanthrone, and anthracene, and subsequently exposing said blend to ultraviolet radiation for a time sufficient to crosslink at least 70 percent of said rubber.

2. The method of claim 1, wherein the vulcanization is conducted at a temperature of from −60° up to 200°C.

3. The method of claim 1, wherein the photosensitizer is benzophenone.

4. The method of claim 1, wherein the blend is first shaped by extrusion, followed by UV curing.

5. A vulcanizable composition comprising
   a. a copolymer consisting of 85 to 99.5% by weight of an isoolefin having about 4 to about 7 carbon atoms combined with 15 to about 0.5% by weight of a conjugated diolefin having about 4 to about 14 carbon atoms containing in the linear backbone conjugated diene unsaturation; and
   b. from 0.01 to 5.0 phr of a UV-responsive photosensitizer wherein said photosensitizer is selected from the group consisting of benzophenone, propiophenone, cyclopropyl phenyl ketone, acetophenone, 1,3,5-triacetylbenzene, benzaldehyde, thioxanthane, authraquinone, β-naphthyl phenyl ketone, β-naphthaldehyde, β-acetonaphthone, 2,3-pentanedione, benzil, fluorenone, pyrene, benzanthrone, and anthracene.

6. The composition of claim 5 wherein there is also present rubber fillers selected from the group consisting of mineral filler, oil, or mixtures of filler and oil.

7. The composition of claim 5, wherein the photosensitizer is benzophenone.

8. The composition of claim 5, wherein there is from 0.1 to 3.0 phr of photosensitizer.

9. A mastic prepared from the composition of claim 5.

10. A sealant prepared from the composition of claim 5.

* * * * *